United States Patent
Li et al.

(10) Patent No.: US 8,149,535 B2
(45) Date of Patent: Apr. 3, 2012

(54) MAGNETIC AND ENCAPSULATION CONTAMINATION CONTROL FOR DISK DRIVES

(75) Inventors: Na Li, Singapore (SG); Yongjun Liang, Singapore (SG); Shaoyong Liu, Singapore (SG); Yi Zhao Yao, Singapore (SG)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 688 days.

(21) Appl. No.: 12/324,778

(22) Filed: Nov. 26, 2008

(65) Prior Publication Data

US 2010/0128388 A1    May 27, 2010

(51) Int. Cl.
*G11B 17/02*    (2006.01)
(52) U.S. Cl. .............. 360/99.12; 360/99.05; 360/98.08; 360/97.02; 360/137; 277/410; 277/409
(58) Field of Classification Search ............... 360/99.12, 360/99.05, 98.08, 137, 97.02
See application file for complete search history.

(56) References Cited

U.S. PATENT DOCUMENTS

| | | | | |
|---|---|---|---|---|
| 4,068,271 A * | 1/1978 | Kok | ............ | 360/97.02 |
| 4,510,541 A * | 4/1985 | Sasamoto | ............ | 360/97.02 |
| 4,899,244 A * | 2/1990 | Morse | ............ | 360/133 |
| 5,047,677 A * | 9/1991 | Mineta et al. | ............ | 310/67 R |
| 5,155,640 A * | 10/1992 | Lee | ............ | 360/98.07 |
| 5,161,900 A * | 11/1992 | Bougathou et al. | ............ | 384/133 |
| 5,214,326 A * | 5/1993 | Yonei | ............ | 310/67 R |
| 5,402,023 A * | 3/1995 | Nakanishi et al. | ............ | 310/90 |
| 5,516,212 A * | 5/1996 | Titcomb | ............ | 384/107 |
| 5,572,078 A * | 11/1996 | Saichi et al. | ............ | 310/90 |
| 5,600,514 A * | 2/1997 | Fukuzawa | ............ | 360/99.08 |
| 5,673,159 A * | 9/1997 | Jinbo et al. | ............ | 360/98.01 |
| 5,942,820 A | 8/1999 | Yoshida | | |
| 6,072,660 A * | 6/2000 | Teshima | ............ | 360/99.08 |
| 6,149,159 A * | 11/2000 | Kloeppel et al. | ............ | 277/399 |
| 6,195,224 B1 | 2/2001 | Kohno et al. | | |
| 6,543,781 B1 * | 4/2003 | Rehm et al. | ............ | 277/410 |
| 6,561,516 B2 * | 5/2003 | Pazhayannur et al. | ............ | 277/410 |
| 6,587,307 B1 * | 7/2003 | Raymond et al. | ............ | 360/137 |
| 6,654,201 B2 * | 11/2003 | Smith | ............ | 360/97.02 |
| 6,717,308 B2 * | 4/2004 | Chen et al. | ............ | 310/90 |
| 6,850,388 B1 * | 2/2005 | Knotts | ............ | 360/99.08 |
| 6,999,271 B2 * | 2/2006 | Shiga | ............ | 360/97.01 |
| 7,486,474 B2 * | 2/2009 | Shin et al. | ............ | 360/97.02 |
| 7,686,871 B2 * | 3/2010 | Oh et al. | ............ | 96/134 |
| 7,729,082 B2 * | 6/2010 | Ang et al. | ............ | 360/97.01 |
| 2007/0263321 A1 | 11/2007 | Chan et al. | | |

FOREIGN PATENT DOCUMENTS

| | | |
|---|---|---|
| EP | 0040278 | 3/1984 |
| JP | 61218344 | 9/1986 |
| JP | 63161561 | 7/1988 |
| JP | 03281772 | 12/1991 |
| JP | 04146585 | 5/1992 |
| JP | 04159657 | 6/1992 |
| JP | 2001332013 | 11/2001 |
| WO | WO 03/071540 | 8/2003 |

* cited by examiner

*Primary Examiner* — Viet Q Nguyen

(57) ABSTRACT

A disk device with disk contamination control having a spindle for rotating at least one disk. A spindle hub located on the spindle. A disk clamp for clamping the at least one disk on the hub. A magnetic clamp seal magnetically and removably attached to the disk clamp wherein the magnetic clamp seal encapsulates disk contaminants between the clamp and the clamp seal. The magnetic clamp seal magnetically collects metallic contaminants within a sealed housing.

20 Claims, 3 Drawing Sheets

MAGNETIC AND ENCAPSULATION CONTAMINATION CONTROL FOR DISK DRIVES

FIELD

Embodiments of the present technology relates generally to the field of computing.

BACKGROUND

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk as a string of bits.

Contamination, such as, but not limited to dust and metallic particles, located in the hard disk system may adversely affect the performance of the hard disk. For example, contamination located on the read/write head may cause unstable flight of the head. Contamination on the magnetic disk medium may contaminate the head and also error in information read/write on the magnetic disk.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Generally, fasteners, such as, but not limited to screws, are used to mechanically clamp magnetic disks to a spindle motor hub. Metallic particles are created due to the tooling interaction with the clamp screws and screw holes on the clamp. Metallic particles can also be created due to the tooling interaction between the clamp screws and threaded holes of the hub. The particles can spread throughout the disk enclosure volume and onto the disk surface(s) and potentially critically damage the HDD. Typically, an adhesive seal is placed on the top clamp to encapsulate the particles and prevent the particles from spreading.

At a HDD manufacturing location, there is usually a re-work process where reusable components of an HDD can be salvaged and reused in the manufacturing of a subsequent HDD. Tremendous effort has been dedicated to remove the seal and adhesive residue from the disk clamp surface without damaging the disk clamp. However, attempts to salvage the clamp for reuse have failed. The means of removing the adhesive seal can damage the disk clamp and the remaining residue attached to the top clamp does not allow the top clamp to be in a condition to be reused. Additionally, the adhesive seal, after being removed from the top clamp, is damaged and no longer in a condition to be reused. Furthermore, the clamp seal and adhesive to attach the clamp seal can cause environmental damage. Therefore, a high percentage of disk clamps and clamp seals from reworked HDD's are wasted and no longer usable.

Figure 1:
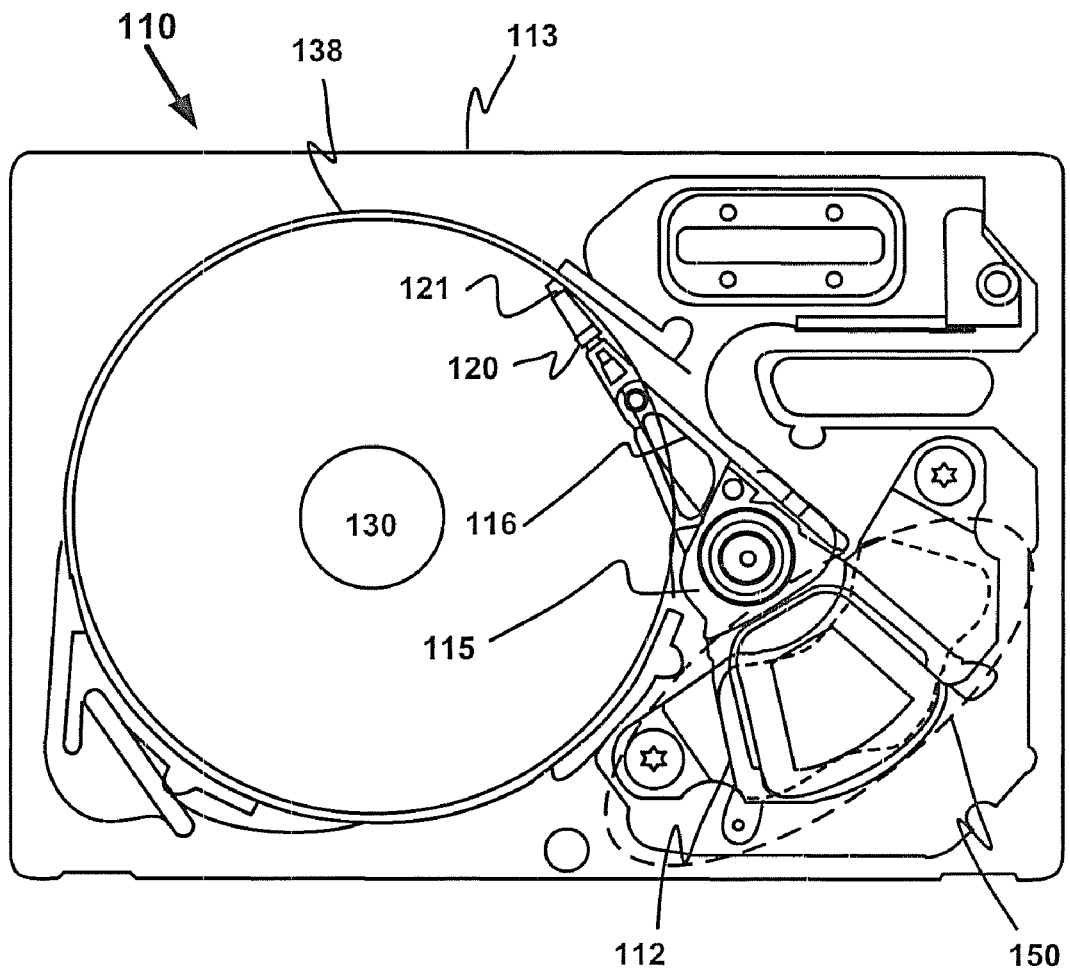
FIG. 1 illustrates an example of a plan view of an HDD with contamination control, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer sealed housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 115 includes one or more actuator arms 116. When a number of actuator arms 116 are present, they are usually represented in the form of a comb that is movably or pivotally mounted to base/housing 113. A controller 150 is also mounted to base 113 for selectively moving the actuator arms 116 relative to the disk 138. Actuator assembly 115 may be coupled with a connector assembly, such as a flex cable to convey data between arm electronics and a host system, such as a computer, wherein HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

Figure 2:
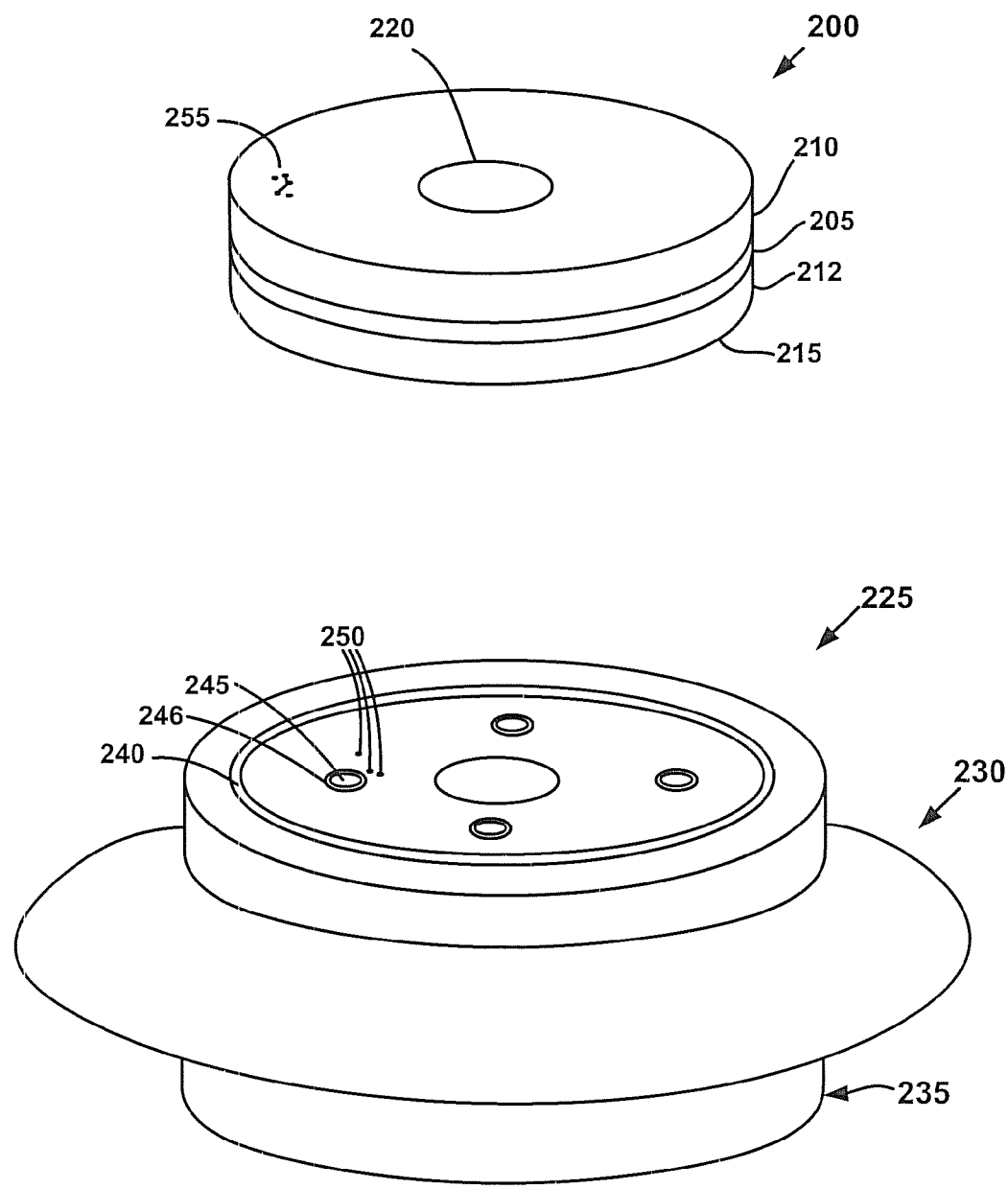
FIG. 2 illustrates an example of an exploded view of a magnetic disk seal attached to a disk clamp, in accordance with an embodiment of the present invention.

FIG. 2 illustrates an example of a magnetic clamp seal 200 attached to a disk clamp plate 225 to facilitate in contamination control of an HDD. A magnetic disk 230 is clamped between a clamp plate 225 and a spindle hub 235 when a screw 245 is screwed into a screw hole 246 in the disk clamp and the screw threads (not shown) are threadably engaged with the threaded screw holes (not shown) in the hub. Contaminants can be created during the tooling interaction between the screw 245 and the screw hole 246 and between the screw and the threaded screw holes of the hub. In addition, contaminants also can be created by engagement of screw driver bit with the screw head during fastening. The contaminants can be but are not limited to metallic particles. The metallic particles can be ferromagnetic. The clamp plate 225 is shown to have four screw holes and with four screws fastened within the four screw holes. The clamp plate 225 can have more or less than four screw holes and accordingly, the hub can have a corresponding amount of threaded screw holes. The clamp plate material can be but is not limited to stainless steel 400 or nickel plated aluminum.

The contaminants 250, created from the engagement of the screws 245 with the screw hole 246 and threaded screw holes are initially in a close proximity to the screw holes. To prevent the spread of the contaminants 250 and potential damage to the HDD, the contaminants are encapsulated between the disk clamp 225 and the magnetic clamp seal 200. The magnetic clamp seal 200 is magnetically and removably attached to the disk clamp 225. As long as the magnetic clamp seal is magnetically attached to the disk clamp 225, the contaminants will not spread and potentially damage the HDD.

The magnetic clamp seal 200 can be a layered structure. Clamp seal has layers 205, 210 and 212. Layer 205 can be a magnetic layer that provides sufficient magnetic force to remain attached to the disk clamp 225 while the disk clamp is static and while the disk clamp is rotating. Layers 210 and 212 can be plastic and substantially cover layer 205. The magnetic clamp seal 200 can be rigid or it can be flexible. In one embodiment, layers 210 and 212 can be a non-metallic material. In another embodiment, the layers can be a non-magnetic material. The layers can also be non-ferromagnetic. In a further embodiment, clamp seal can have no plastic layers. For instance, clamp seal could have one magnetic layer and one non-magnetic layer. In an embodiment, the clamp seal could have numerous layers of magnetic and non-magnetic layers.

In another embodiment, the non-metallic layers prevent magnetic particle drop off.

The magnetic clamp seal 200 has a center hole 220. The center hole 220 allows for access to motor shaft (not shown). While the motor is running, the motor shaft remains static. However, the hub turns around the shaft.

The magnetic clamp seal 200 is coaxial aligned to disk clamp 225 when attached to the disk clamp. During the operation of the HDD, the clamp plate 225, disk 230 and hub rotate about a central axis. The clamp seal 200 must be aligned with the central axis so that the HDD can rotate at an appropriate rate. The misalignment of the seal on the disk clamp can cause an improper rotation rate of the disk 230 which could result in a damaged HDD and/or improper reading/writing of information of the disk.

The magnetic clamp seal 200 can be coaxially aligned onto the disk clamp 225 by an extruded ring 215 on the bottom side of the clamp seal that substantially corresponds to a slot 240 on the top surface of the disk clamp. In one embodiment, the seal is coaxially aligned onto the clamp by an alignment feature on the clamp seal that substantially corresponds with a coaxial alignment feature of said disk clamp. In another embodiment, the seal is coaxially aligned onto the clamp by a protrusion on the clamp seal that substantially corresponds with an indentation of said disk clamp.

As stated above, the magnetic clamp seal 200 has sufficient magnetic force to be rotationally retained onto the disk clamp 225. In one embodiment, the seal is further rotationally retained on the disk clamp by an extruded ring 215 on the bottom side of the clamp seal that substantially corresponds to a slot 240 on the top surface of the disk clamp. In an embodiment, the seal is further rotationally retained onto the clamp by a rotationally retaining feature on the clamp seal that substantially corresponds with a rotationally retaining feature of the disk clamp.

In another embodiment, the seal is further rotationally retained onto the disk clamp by a protrusion on the clamp seal that substantially corresponds with an indentation of the disk clamp. In yet another embodiment, there is an additional magnetic force between the clamp seal and the disk clamp due to the metallic screws used to clamp the disk clamp to the hub. The material of the screws can be but is not limited to stainless steel 400.

The magnetic field of the magnetic clamp seal 200 impacts the magnetic disk 230 and/or the read/write head. In an embodiment, the magnetic field of the seal can be adjusted so that it will not impact the magnetic disk(s) and/or the read/write head(s).

HDD's have an exterior sealed housing that protects the components within the HDD from contamination. The sealed housing can prevent contaminants from entering and damaging the HDD, however, the sealed housing cannot prevent contaminants already inside the sealed housing from damaging the HDD. Additionally, the sealed housing cannot prevent contaminants created inside the sealed housing from damaging the HDD.

The magnetic clamp seal 200, in addition to encapsulating contaminants between the clamp seal and disk clamp, also magnetically collects ferromagnetic metallic contaminants 255 within the sealed housing. The contaminants are magnetically collected to the exterior of the clamp seal and are prevented from spreading through the interior of the sealed housing and damage the HDD. The contaminants 255 can be created in the same manner as contaminants 250, as described above. In one embodiment, the contaminants can be created in the HDD during operation of the HDD. The material of the contaminants can be, but are not limited to stainless steel, NiP and nickel plated aluminum particles.

Figure 3:
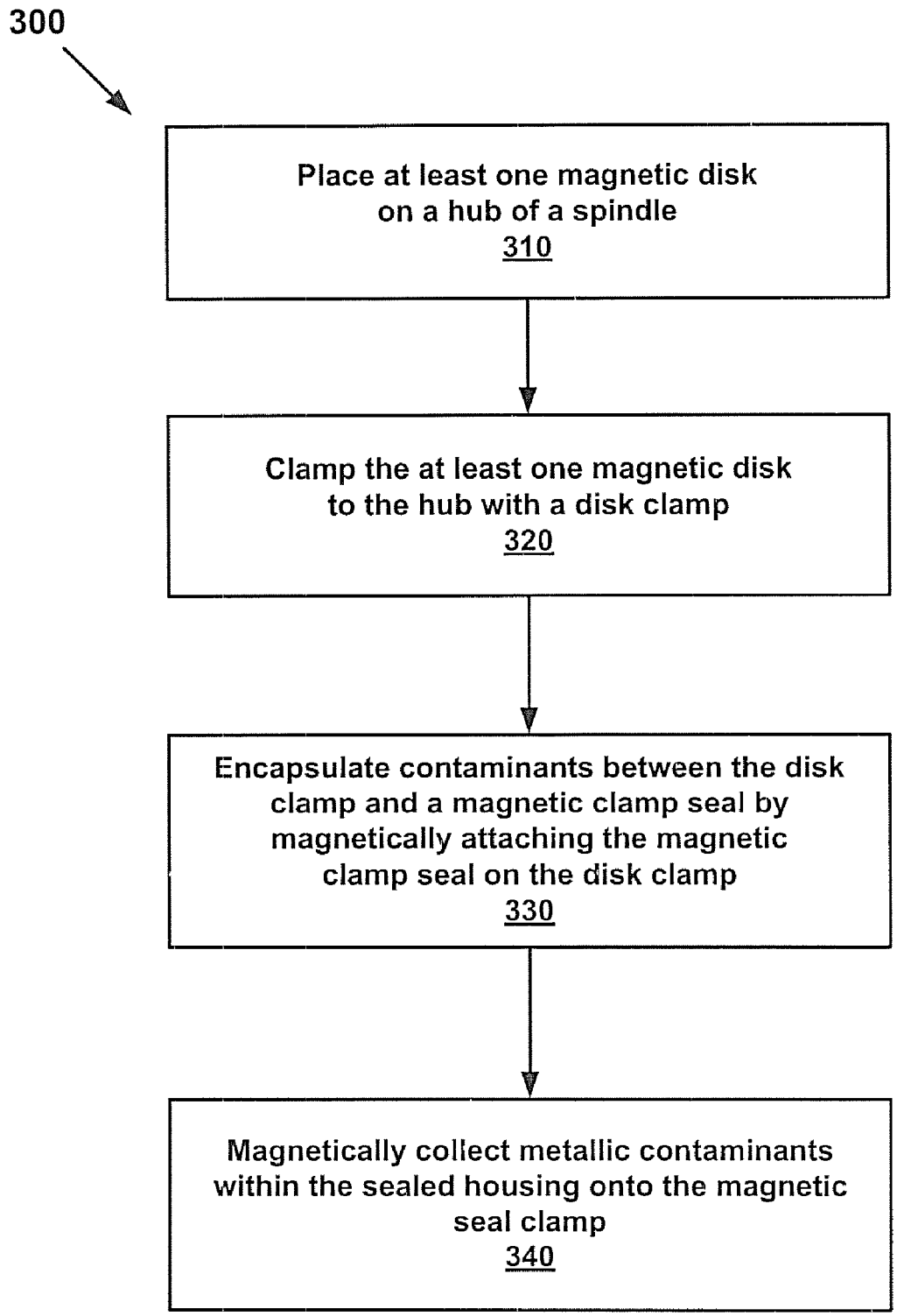
FIG. 3 illustrates an example of a flow chart of a method of an HDD with contamination control, in accordance with an embodiment of the present invention.

FIG. 3 illustrates the method 300 of manufacturing an HDD with contamination control. At block 310, at least one magnetic disk is placed on a hub of a spindle. At block 320, at least one magnetic disk is clamped to the hub with a disk clamp. At block 330, contaminants are encapsulated between the disk clamp and a magnetic clamp seal by magnetically attaching said magnetic clamp seal on said disk clamp. At block 340 metallic contaminants located within a sealed housing are magnetically collected onto the magnetic clamp seal.

During the manufacturing of an HDD, the magnetic clamp seal 200, allows for easy install of the seal onto the clamp, which decreases the time to manufacture the HDD. During the manufacturing of an HDD, there is usually a rework process where reusable components of an HDD can be salvaged and reused in the manufacturing of a subsequent HDD. During rework, the magnetic clamp seal is easily removed from the disk clamp without damaging the disk clamp or the clamp seal. The undamaged disk clamp, in the rework process, can be subsequently used in another HDD. The undamaged magnetic clamp seal, in the rework process, can be reused in another HDD.

The lack of damage to the magnetic clamp seal and disk clamp saves the cost of rework to the magnetic clamp seal and/or disk clamp. Similarly, the lack of damage to the magnetic clamp seal and disk clamp, during the rework process, saves the cost of manufacturing a new clamp seal and/or disk clamp. Additionally, there is a minimizing of waste and environmental impact of the waste by the reuse of the seal and/or clamp.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A disk device comprising disk contamination control, said disk device comprising:
    a spindle for rotating at least one disk;
    a spindle hub located on said spindle;
    a disk clamp for clamping said at least one disk on said hub; and
    a magnetic clamp seal magnetically and removably attached to said disk clamp, wherein said magnetic clamp seal encapsulates disk contaminants between said clamp and said clamp seal, and wherein said magnetic clamp seal magnetically collects metallic contaminants within a sealed housing, and wherein said magnetic clamp seal is rotationally retained by magnetic force on said disk clamp.

2. The disk device of claim 1, wherein said magnetic clamp seal magnetically collects said metallic contaminants within said housing that are not encapsulated between said clamp and said clamp seal.

3. The disk device of claim 1, wherein said contaminants are created when said disk clamp is clamped to said hub.

4. The disk device of claim 3, wherein said contaminants are ferromagnetic.

5. The disk device of claim 1, wherein a magnetic field of said magnetic clamp seal does not magnetically interfere with data stored on said at least one disk.

6. The disk device of claim 1, wherein a magnetic field of said magnetic clamp seal does not magnetically interfere with at least one read/write head.

7. The disk device of claim 1, wherein said magnetic clamp seal has a plurality of layers.

8. The disk device of claim 7, wherein at least one layer is non-metallic.

9. The disk device of claim 7, wherein a magnetic layer of said clamp seal is substantially surrounded by non-metallic layers.

10. The disk device of claim 1, wherein said magnetic clamp seal is coaxially aligned on said disk clamp.

11. The disk device of claim 1, wherein said clamp seal is further rotationally retained and coaxially aligned on said disk clamp by at least one protrusion on a surface of said clamp seal that substantially corresponds with at least one indentation on said disk clamp.

12. A method of manufacturing a disk device with contamination control, said method comprising:
    placing at least one magnetic disk on a hub of a spindle;
    clamping said at least one magnetic disk to said hub with a disk clamp;
    encapsulating contaminants between said disk clamp and a magnetic clamp seal by magnetically attaching said magnetic clamp seal on said disk clamp, wherein said magnetic clamp seal is rotationally retained by magnetic force on said disk clamp; and
    magnetically collecting metallic contaminants located within a sealed housing onto said magnetic clamp seal.

13. The method of claim 12, wherein said magnetic clamp seal magnetically collects metallic contaminants within said housing that are not encapsulated between said clamp and said clamp seal.

14. The method of claim 12, wherein said contaminants are created when said disk clamp is clamped to said hub.

15. The method of claim 12, wherein a magnetic field of said magnetic clamp seal does not magnetically interfere with data stored on said at least one magnetic disk.

16. The method of claim 12, wherein a magnetic field of said magnetic clamp seal does not magnetically interfere with at least one read/write head.

17. The method of claim 12, wherein said disk clamp is removed from said disk device for subsequent reuse in another disk device; and
    wherein removal of said magnetic clamp seal from said disk clamp does not damage said disk clamp for said subsequent reuse in said another disk device.

18. The method of claim 12, wherein said magnetic clamp seal is removed from said disk device for subsequent reuse in another disk device; and
    wherein removal of said magnetic clamp seal from said disk clamp does not damage said magnetic clamp seal for said subsequent reuse in said another disk device.

19. A disk-shaped magnetic clamp seal with a central hole magnetically and removably attached to a disk clamp of a disk device in a sealed housing for encapsulating contaminants between said clamp seal and said disk clamp, and magnetically collecting metallic contaminants within said sealed housing, wherein said disk clamp clamps at least one magnetic disk onto a hub located on a spindle, said disk-shaped magnetic clamp seal comprising:
    a disk-shaped magnet with a central hole having a magnetic field that does not magnetically interfere with data stored on said at least one magnetic disk and said magnetic field does not interfere with at least one read/write head for reading/writing data onto said at least one magnetic disk; and at least one non-metallic layer covering at least one surface of said magnet;

wherein said clamp seal is coaxially aligned with said disk clamp, and said clamp seal is rotationally retained by magnetic force on said disk clamp.

20. The disk-shaped magnetic clamp seal of claim 19 further comprising:

an additional retaining and alignment feature on said clamp seal that further coaxially aligns and rotationally retains said clamp seal on said disk clamp that substantially corresponds with a coaxial alignment and rotationally retaining feature of said disk clamp.

* * * * *